May 5, 1931.                C. B. THORNE                1,804,188
         MEANS FOR SEPARATING PARTICLES FROM FREE WATER
                Filed Oct. 6, 1928       3 Sheets-Sheet 3

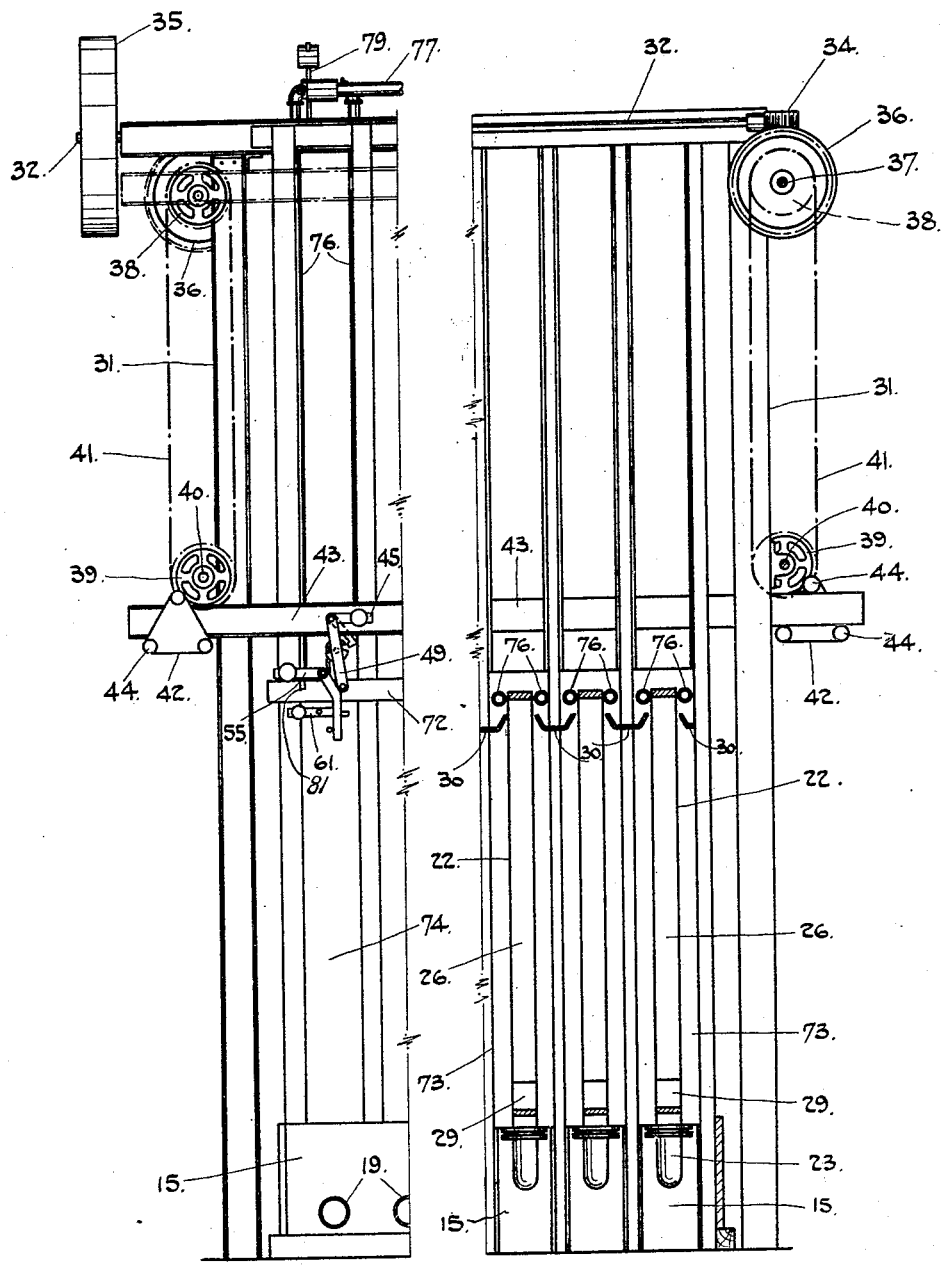

INVENTOR.
C. B. Thorne.
BY E. J. Featherstonhaugh
ATTORNEY.

Patented May 5, 1931

1,804,188

UNITED STATES PATENT OFFICE

CARL BUSCH THORNE, OF HAWKESBURY, ONTARIO, CANADA

MEANS FOR SEPARATING PARTICLES FROM FREE WATER

Application filed October 6, 1928. Serial No. 310,871.

The invention relates to means for separating particles from free water, as described in the present specification and illustrated in the accompanying drawings that form part of the same.

The invention consists essentially of the novel features of construction pointed out broadly and specifically in the claims for novelty following a description containing an explanation in detail of an acceptable form of the invention.

The objects of the invention are to eliminate the freedom with which the water flows through the separating members and thereby avoid carrying away to the sewer valuable fibrous elements that otherwise would materially increase the output of the mill; to maintain in such machines efficiency and continuity during their operations, notwithstanding what the conditions of the white water treated may be; to construct a machine in such a manner that the parts will be accessible at all times and further that the performance of the machine will be visible to the operator; to increase the effectiveness of the separation by the utilization of the particles with further particles, and thus discharge to the sewers clear water or substantially clear water; to simplify the operation of the separating members, whereby the raising, the lowering and the resting will all be timed in conformance with the condition under which the machine operates; and generally to provide a reliable, durable and serviceable machine at a comparatively low cost of production.

In the drawings, Figure 1 is a longitudinal sectional view of the machine.

Figure 2 is a front elevational view showing one unit of the machine.

Figure 3 is a vertical sectional view on the line 3—3 in Figure 1.

Like numerals of reference indicate corresponding parts in the various figures.

Figure 1:
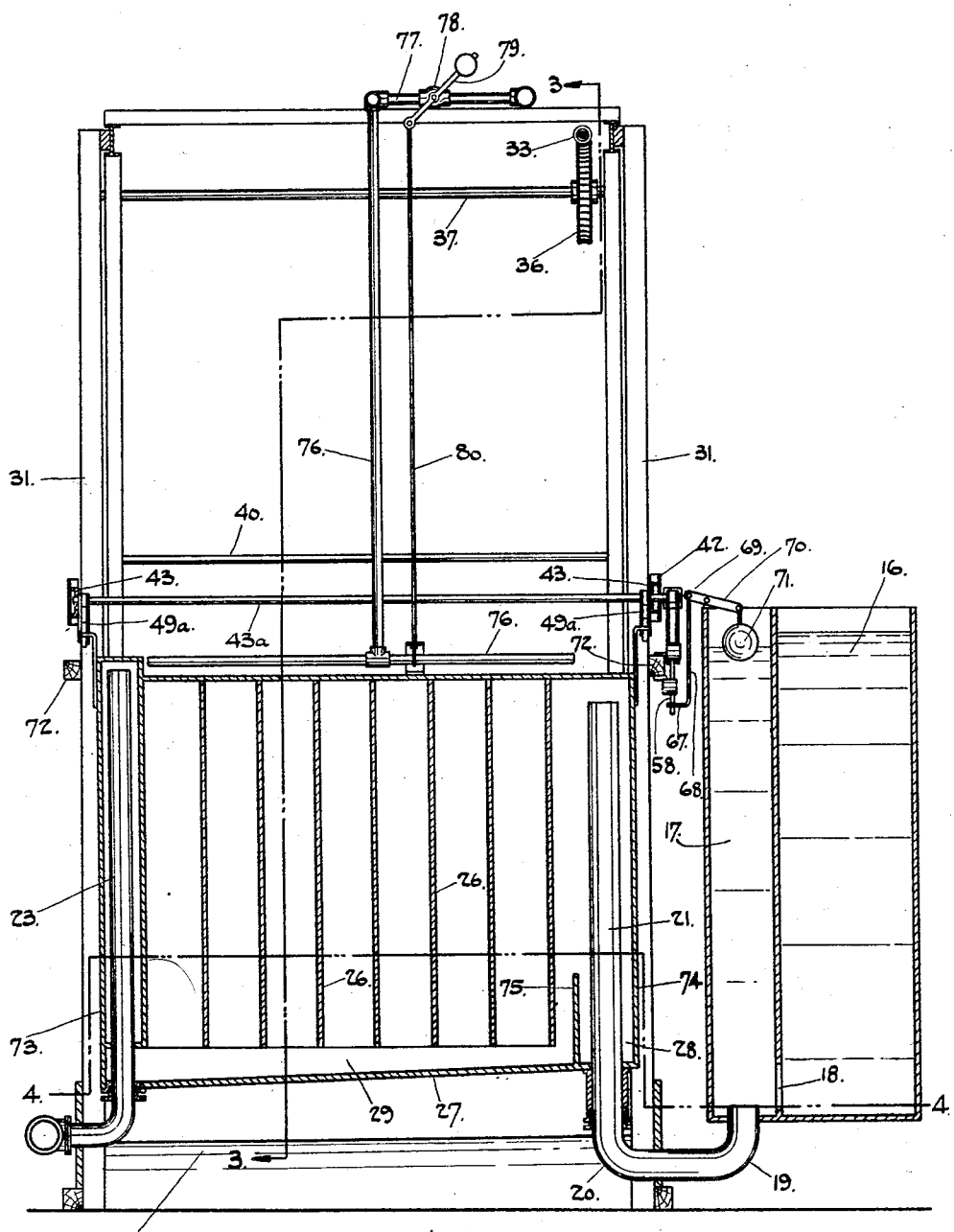
Figure 5:
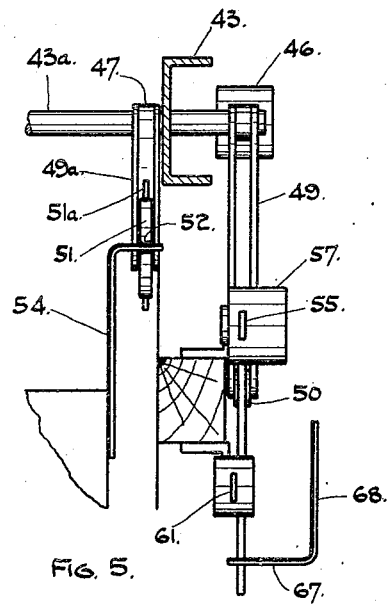
Figure 5 is a detail of the operating mechanism at right angles to the view shown in Figure 6.
Figure 6:
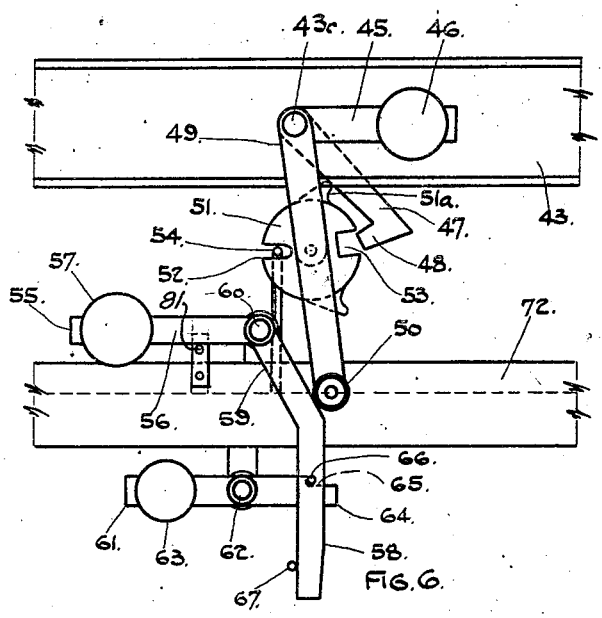
Figure 6 is a detail of the operating mechanism.
Figure 4:
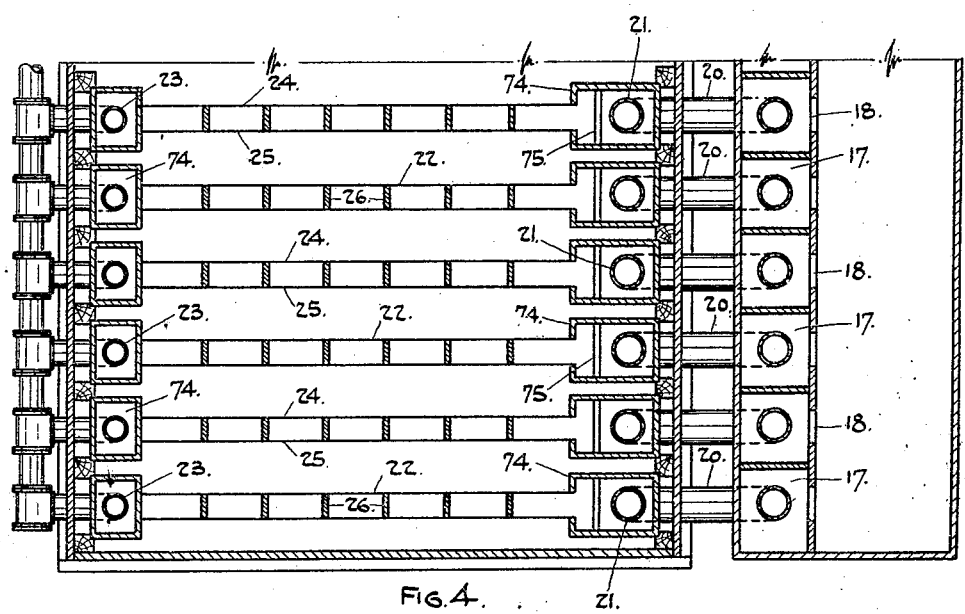
Figure 4 is a cross sectional view on the line 4—4 in Figure 1.

Referring to the drawings, the numeral 15 indicates an open trough forming the passage to the sewer, that is to say, the passage for the final waste water.

The feed receptacle 16 is common to the several separating devices and divided from the individual head boxes 17, the latter communicating with said feed receptacle by means of the orifices 18 respectively.

Each head box 17 has an outlet pipe 19 extending from an opening in the bottom thereof and extending in a horizontal section 20 to the vertical section 21, the latter forming the inlet in each case to a screen 22, as well as a guide on which the screen slides.

At the other end of the screen the pulp fiber outlet pipe 23 forms a guide on which the screen slides, this outlet pipe 23 being curved outwardly at its lower end and secured to the trough structure by means of which it is supported.

The screen 22 is formed on a wooden or metal frame, the construction of which is not a salient feature of the invention, and comprises the wire meshes 24 and 25 and the vertical partitions 26 extending downwardly and terminating short of the inclined floor 27 of the screen, this floor communicating with the end division 28 in which the feed pipe 21 is contained.

It will thus be seen that the white water flowing out through the pipe 19 finds its way in through the vertical feed section of said pipe 21 and communicates with each division of said screen by means of the lower passage 29, thus the water rises in the screen as the screen is lowered to effect its rise, but in the beginning of its descent it passes the troughs 30, which are inserted between the several screens.

These troughs are situated in the upper positions so that as the screens descend the first water has an opportunity to flow comparatively freely through the untouched mesh or what one may call, clean mesh, consequently this water which goes through the screen is comparatively full or particles or fiber, therefore, it is let into these troughs 30 and carried away to be again treated.

In this first descent of the screen, as the several divisions pass the upper troughs 30, the interstices of the screen become partially clogged up, consequently by the time that portion of the screen has passed the troughs 30, it is in a fit condition to take the remainder of the water for a coating of the fiber is already on each wire mesh and as the water passes through this partially clogged screen the particles in the water must cling to the collection already on the screen, thereby letting comparatively clear water through the screen and to the sewer passage.

Each screen must of course be raised and lowered and mechanism for this purpose is provided in this invention, though this mechanism may be considerably changed, and further the screens themselves may be operated in various ways, and further the water may be sent into the screen from outside instead of out of the screen from the inside.

In this operating mechanism, a frame 31 is erected and extends above the screens, and at the upper end of this frame a worm shaft 32 carrying the worms 33 and 34 is suitably journalled and driven through the pulley 35.

These worms coact with the worm wheels 36 mounted on the shafts 37, and these worm wheel mechanisms drive the sprockets 38 on shafts 37, which are connected to the lower sprockets 39, mounted on the shafts 40, by the chains 41.

On these chains 41 the triangular hangers 42 are secured, and these hangers carry the beams 43, which are attachable and detachable from the screens.

The hangers 42 carry three sets of roller bearings 44, two of which support the beam on the underside, while the remaining roller bearing travels on the upper side of the beam, that is to say, the upper and lower sides of the beam form tracks, which permits the beam to move freely in its supports.

The raising mechanism, in so far as the sprockets and chains are concerned, is exactly the same at each end of the machine, as the sprocket and chain mechanisms are repeated at the other ends of the shafts 37 and 40, though the two worm and worm wheel mechanisms are sufficiently driven by the shafts 32.

The shaft 43a extends across the machine and is journalled in the beam 43 on the one side and in the beam 43 on the other side, and one of these beams 43 carries a crank lever operating mechanism fixedly mounted on the shaft 43a projecting through the beams.

This crank lever mechanism is formed of the horizontal arm section 45 on which the weight 46 is mounted, and of the downwardly extending arm section 49 carrying at its lower end the roller 50.

On the other side of this beam the latch arm 47 being a mid arm section between the arm section 45 and the arm section 49 is fixedly mounted on the shaft 43a and is formed with the latch end 48.

A similar latch arm is mounted adjacent to the other portion 43, that is to say, at the other side of the machine. Adjacent to this latch arm, the arm 49a extends downwardly from the beam and is rigidly secured thereto, the shaft 43a extending through this arm 49a and this arm 49a carries the rotary catch 51 having the hook slots 52 on the one side and the latch slot 53 on the other side.

The stops 51a extend from the upper and lower ends of this rotary catch, so as to limit its rotary movements.

A similar rotary catch is pivotally mounted on a similar arm adjacent to the latch arm at the other side of the machine.

The hooks 54 are rigidly secured to the screens and these hooks enter the hook slots 52 while the latch arms are intended to enter the slots 53 and hold the rotary catches from rotation during the lifting and the lowering of the screens.

Ordinarily, while the collection of fibrous material or particles is being made the rotary catches 51 pass and repass the hooks 54 without any effect whatsoever, that is to say, the slots 52 diametrically engage and disengage the hooks 54 from the frame of the screen and it is only when these rotary catches are locked by the catches 48 that the actual connections to the screen are made for lifting purposes, therefore the operating arm 49 must be held outwardly against its natural inclination to drop through the weight on the arm 45.

The crank lever 55 is formed of the horizontal section 56, carrying the weight 57 and the vertical section 58 having the offset 59 leading to the pivot point 60.

The rocker arm 61 is pivotally secured centrally by the pivot 62 and on its outer end carries the weight 63 and on its inner end 64 projects beyond the vertical section 58 and is notched at 65 to engage the pin 66, projecting from the vertical section 58, which will under ordinary circumstances hold the rocker arm 61 from being upset by its weighted end, but it is necessary that this should not only be held, but it should be locked, as the roller 50 of the operating arm 49, each time it comes down, naturally will engage the projecting end 64 of the rocker arm 61, therefore the pin 67 is introduced behind the vertical section 58, so that it is positively locked.

This pin 67 is preferably an offset from the rod 68, which is pivotally secured at 69 to the central pivoted lever 70, said lever 70 at the other end carrying the float 71 in a head box 17, each head box being provided with one of these floats and with the mechanism extension and also for each screen the same set of arms and levers are supplied all being supported from a rigid bar 72, but at the other ends of the screens, there are no such levers required, merely the rotary arms on the opposite beam.

These rotary catches and operating arms work coincidently with the operating arms and catches actuated by the crank levers and floats, consequently both ends of the screen will be lifted at the same time and lowered at the same time by the beams at either end, and these beams slide on the pipes 21 and 32 which are contained within the closed boxes 73 at one end of the screen and 74 at the other end of the screen, so that the lifting and lowering of the said screens will be accomplished in a very smooth manner.

In the operation of this invention—

The screens 22 of which there may be any number desired are connected to individual head boxes, which communicate with the main feed of white water.

Of course the form of the feed receptacle is unimportant as it may be a spout from the mill of any passage of tank having outlets leading into the several head boxes.

The screens 22 slide upwardly and downwardly on the inlet pipe 21 and the outlet pipe 23. The outlet pipe 23 is completely enclosed for the greater part of its length in a compartment at one end of the screen, while the inlet pipe where it enters the screen is also partially enclosed in a box-like end.

It has been explained in the foregoing that the screen partitions terminate short of the inclined bottom 27 and this inclined bottom leads to the outlet through which the outlet pipe 23 extends. Consequently, the screen from the interior will naturally empty into this pipe 23, when the screen is at its extreme upper position, as more fully explained hereinafter.

The screen starts from its extreme upper position and the white water from the head rises in the pipe 21 and overflows from the upper open end of the pipe into the screen, which is of course, wire mesh on both sides.

This water will naturally be on a level with the top of the inlet pipe, and as the screen begins to descend the white water is screened through the mesh and empties from either side, first into the trough 30 and from this trough 30 it is directed back to the feed, but as the screen continues to descend below the trough 30 the waste water passes through the screen from either side into the passage 15 to the sewer.

The reason of this first discharge into the trough 30 is to partially clog the interstices of the screen, which being partially blocked with fibre effects a very much better screening below the trough, while the free discharge into the trough recovers the water for further screening.

The screen continues its downward course, until it reaches the lower end and there it remains temporarily for effectually blocking the screen on both sides with fibre, and thereby prevents any more water finding its way to the sewer, that is to say, little or no water will then find its way through the wire mesh walls of the screen. Consequently, as the water cannot find an outlet to the sewer, it backs up in the inlet pipe or more properly it ceases to flow with the result that the float 71 is raised and this operates the rocker arm 70.

The rocker arm 70 is pivotally secured to the rod 68, and as the float rises the rod 68 pushes the pin 67 downwardly, until the said pin clears the vertical section 58 of the crank lever 55. This crank lever 55 is pivoted at 60 and weighted, therefore, when the trip arm 61 is removed from the pin 66, there is nothing to hold the crank lever from swinging on its pivot against the power of the weight 57 and this is accomplished by the weighted arm 49, as explained hereinafter.

It has been explained in the description of the details that the beam 43 moves upwardly and downwardly and that the beam is suspended on hangers secured to chains, operating on sprockets suitably driven, consequently, as this beam lifts it naturally carries the screen with it, presuming that the screen is connected thereto, but in its lower most position, the hooks 54, rigid with the screen, are idle in and out of the rotary catches 51, for as the beam reciprocally travels upwardly and downwardly in a continuous motion, the hooks 54 slip in and out of the slots 52 and to effect the lifting motion to the screen, the catches 51 must be locked and held.

To effect this locking, the interstices of the screen must be blocked, therefore, the screen does not rise, until it is ready, but immediately following the retention of the white water in the screen, the white water in the head box rises and this lifts the float and rocks the arm 70 which drops the pin 67, so that the beam descending carries the roller 50 along the back of the crank lever section 58, until it engages the projecting end 64 of the trip rocker arm 61.

In consequence of the pin 67 being dropped the crank lever section 58 is freed and the pin 66 rides on the trip arm 61, which frees the arm 49 to permit the latch 48 to enter the slot 53 in the rotary catch 51. The hooks are now rigidly held in the slots 52 for the elevation of the screen with the beam 43 in its upward movement.

The upward movement of the screen brings it to the spray pipe 76, which receives its supply of water from the supply pipe 77, into which the valve 78 is introduced.

This valve 78 is operated by the weighted arm 79 mounted on its stem and this weighted arm is pivotally connected to the operating tension rod 80.

The downward movement of the screen draws on this tension rod against the weighted end of the arm 79, therefore, as the upward movement progresses this tension is released and the weight opens the valve 78, so that as the screen passes the spray pipe, the jets of water clean the wire mesh and carry the fibre to the bottom of the screen.

The screen continues to rise, until the top of the outlet pipe 23 is clear of the floor 27 of the screen, then the recovered fibre flows into the outlet pipe and is discharged from the screen.

The screen now begins to descend and when the white water begins to flow through the cleared screen, the level drops in the head boxes, and consequently, the float, and this rocks the arm 70 and raises the pin 67.

The weight 57 brings the horizontal section 56 of the crank lever downwardly into contact with the stop 81, at once on the release of the pressure of the arm 49 which travels upwardly with the screen, therefore, the pin 67 rises behind the section 58, to reset the parts for the next upward movement as timed by the operation of the float.

In order to give a better understanding of the engaging and resetting of the latch mechanism parts it may be explained that as the beam 43 moves downwardly the roller 50 runs on the arm section 59 and then on the arm section 58 until it engages the projecting end 64 of the rocker arm 61.

This clears the pin 66 of the notch 65 and when the offset rod section 67 has been removed through the clogging of the screen the continued pressure of the arm 49 on the section 58 slides the pin 66 inwardly clear of the notch, but still on the rocker arm 61 which it never leaves. The inward movement of the arm 49 carries the latch arm with it, and consequently the latch 48 enters the slot 53 thus locking the hooks 54 of the screen in the slots 52, which means that the screen is now lifted with the return upward movement of the beams 43, these beams of course continually reciprocating as explained.

The return upward movement of the beams carries the arm section 49 away from the arm sections 58 and 59, thus relieving the pressure from the latter arm sections.

The weight 57 will now return the arm sections 58 and 59 to their original positions, thus the pin 66 will slide along on the rocker arm 61, until it reaches the notch 65 and later the offset rod section 67 will find its original position behind the arm section 58 which has been fully explained in the foregoing, thus providing a track for the idle movement of the roller 50 during the clogging of the screen.

What I claim is:—

1. In means for separating particles from free water, a receptacle forming the discharge for the free water, a screen in said receptacle for collecting the particles, and an outlet for the waste water and reciprocally operating to and from said receptacle, recovery troughs forming primary discharge passages and means for feeding liquid containing particles to said screen.

2. A screen operating mechanism comprising a suspended beam continuously in reciprocal motion, and having an operating pivoted arm on said beam and carrying a rotary slotted catch member, and a weighted offset, a latch arm cooperating with said catch, a fixed beam, a weighted crank lever pivoted on said fixed beam and engaged by said operating arm, a rocker trip arm weighted and notched to engage a pin stop on the crank lever and projecting beyond said lever, and released by said operating arm, and a float operating in a head box and operatively connected to a stop engaging said crank lever.

3. A screen operating mechanism comprising a horizontal beam continuously moving upwardly and downwardly, a frame having shaft bearings, a worm shaft journalled in said bearings and carrying worms towards either end, worm wheels coacting with said worms and mounted on shaft journalled in said frame, chain and sprocket mechanism driven from said worm wheel shafts to lower shafts, suspension brackets carrying said beam and flexibly secured on said chains, means for driving said worm shaft, hooks secured to the screens and a latch mechanism suitably supported and operating to connect to and disconnect said beam from a screen.

4. In means for separating particles from free water, a receptacle for the water containing the particles, a barrier having openings therethrough and adapted to collect the particles to block said openings following the flow of the waste water and reciprocally operating into and out of said receptacle, recovery troughs forming primary discharge passages and a waste water outlet.

5. In means for separating particles from free water, a receptacle for the white water, a barrier forming a chamber and having spaced wire meshes adapted to stop and collect the particles, inlet and outlet pipes extending into said chamber, means for raising and lowering said screen, slideways for said barriers, means for reclaiming the first water discharge through the barrier and means for discharging the waste water.

6. In means for separating particles from free water, a feed receptacle, a head box communicating with said feed receptacle a waste water receptacle and reclaiming troughs, barriers of spaced wire meshes and forming inlet chambers and slidably mounted feed and discharge pipes extending into said chamber and means for raising and lowering said barriers operable on the clogging and clearing of said screens respectively.

7. In means for separating particles from free water, a waste water receptacle, a screened member forming an inlet chamber and having end compartments, and reciprocally mounted within said receptacle, feed and discharge pipes extending upwardly in said end compartments and forming slideways for said screen, means for lifting and lowering said screen on said pipes, a feed receptacle connected to one of said pipes, and means for removing the particles from the screen during its upward movement.

8. In means for separating particles from free water, a trough, a double faced screen formed of spaced wire meshes, forming a chamber having compartments and fixed inlet and outlet members, means for lifting and lowering the screen at intervals and bringing the several compartments into communication with said inlet member for screening purposes and into communication with said outlet member in its elevated position, and means gathering the particles from the screens and passing them into said outlet.

9. In means for separating particles from free water, a trough, a screen member forming an inlet chamber constructed of spaced wire meshes mounted on a frame extending downwardly to a bottom forming a discharge receptacle below vertical divisions, a discharge pipe from said discharge receptacle and forming a fixed guideway for the screen, an inlet pipe forming a fixed guideway for the screen, means operable on the clogging of the screen for raising it, means for lowering the screen following the discharge of particles, and means for recovering the first water discharged through the screens, preceding waste water discharge.

10. A screen operating mechanism comprising a plurality of screens in a receptacle, beams for lifting and lowering the screens, means for raising and lowering said beams, latch mechanism engaging said screens from said beams, for raising and lowering purposes and releasing said screens for clogging purposes, and means for operating said latch mechanism and connecting the screens to the beams for raising purposes operable on the blocking of the screen interstices and the consequent stoppage of the flow of waste water therethrough.

11. A plurality of separating screens forming outlets for reclaimable water in course of their travel and outlets for discharging waste water until blocked by fibers during the descent and fixed trough intermediately supported in the screenways and forming passages for the recovery water.

Signed at Montreal, Canada this 23rd day of August, 1928.

CARL BUSCH THORNE.